(12) United States Patent
Sato

(10) Patent No.: US 8,116,395 B2
(45) Date of Patent: Feb. 14, 2012

(54) MB-OFDM RECEIVER THAT WEIGHTS A QUALITY OF EACH SUBCARRIER

(75) Inventor: Takahiro Sato, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 627 days.

(21) Appl. No.: 12/252,687

(22) Filed: Oct. 16, 2008

(65) Prior Publication Data

US 2009/0122888 A1    May 14, 2009

(30) Foreign Application Priority Data

Nov. 9, 2007    (JP) ................................. 2007-291925

(51) Int. Cl.
*H04L 27/28* (2006.01)

(52) U.S. Cl. ........ 375/260; 375/316; 375/346; 375/348; 329/318; 455/63.1; 455/296

(58) Field of Classification Search .................. 375/260, 375/316, 346, 348; 329/318; 455/63.1, 296
See application file for complete search history.

(56) References Cited

U.S. PATENT DOCUMENTS

2004/0127245 A1*   7/2004   Sadri et al. .................... 455/522
2004/0199554 A1*  10/2004   Aslanis et al. ................ 707/204

FOREIGN PATENT DOCUMENTS

JP    2005-6116     1/2005
JP    2005-269392   9/2005

OTHER PUBLICATIONS

ISO/IEC 26907 High Rate Ultra Wideband PHY and MAC Standard, Fast-Track Procedure, 2006, pp. 14-72.

* cited by examiner

*Primary Examiner* — Chieh M Fan
*Assistant Examiner* — Leila Malek
(74) *Attorney, Agent, or Firm* — Young & Thompson

(57) ABSTRACT

An exemplary aspect of an embodiment of the present invention is a receiver comprises a subcarrier unit combination section that performs weighting corresponding to quality of each subcarrier with respect to each subcarrier relating to a received symbol, a symbol unit combination section that performs common weighting based on quality of the symbol with respect to each subcarrier, and a combination system switching unit that switches between use of the symbol unit combination section and the subcarrier unit combination section.

5 Claims, 20 Drawing Sheets

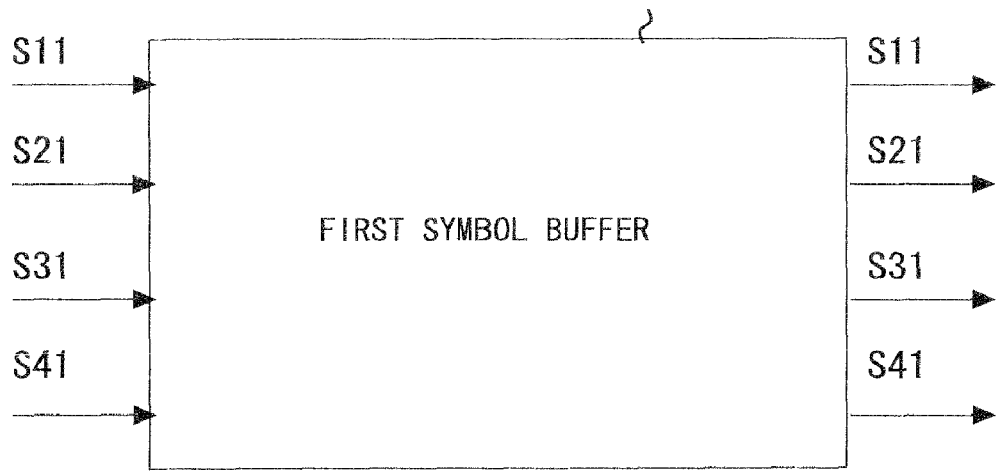
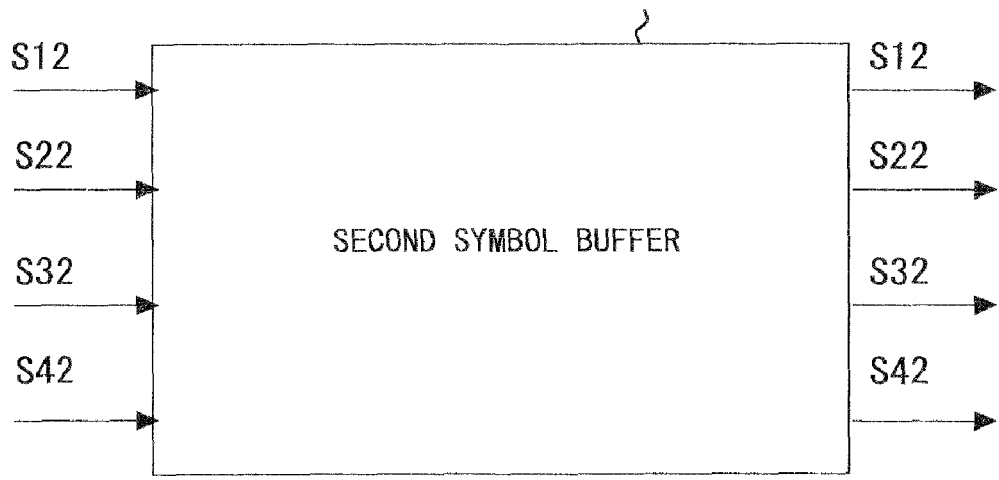
Fig. 8

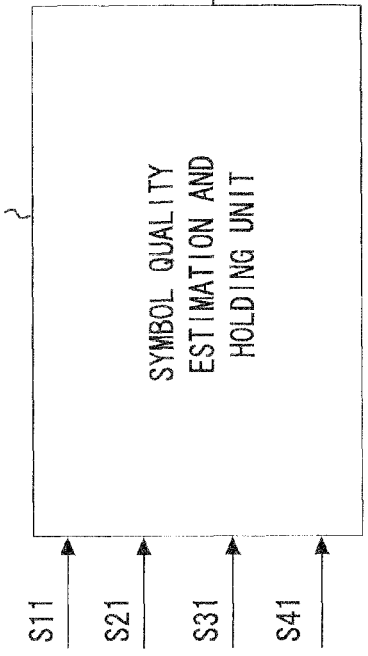
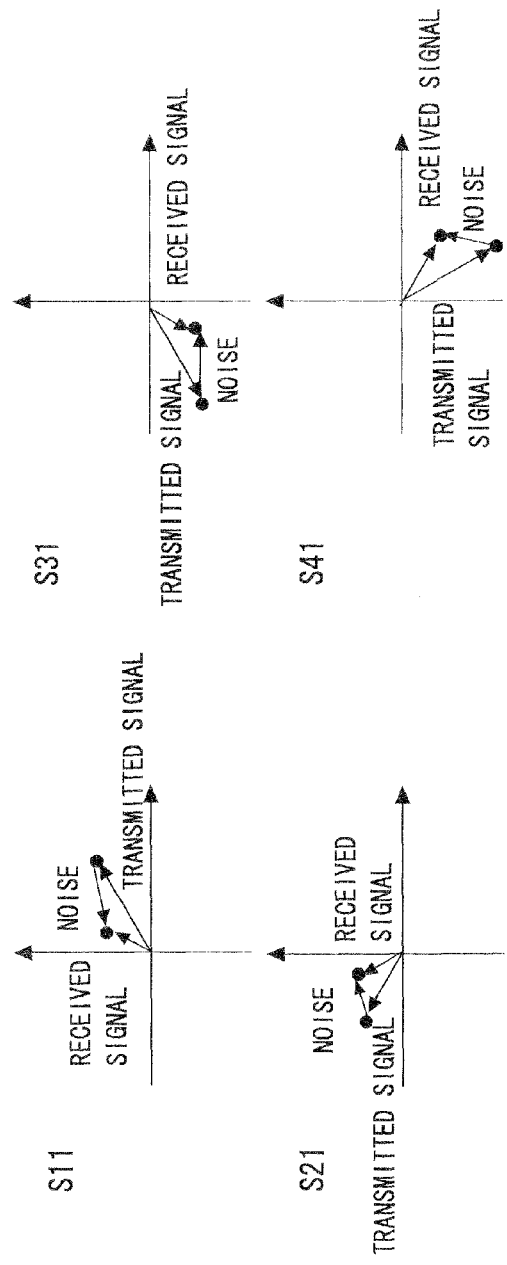
Fig. 9A
Fig. 9B

MB-OFDM RECEIVER THAT WEIGHTS A QUALITY OF EACH SUBCARRIER

BACKGROUND

1. Field of the Invention

The present invention relates to a wireless data receiver, and more particularly to a receiver that receives signals modulated in a multiband orthogonal frequency-division multiplexing (MB-OFDM) method.

2. Description of Related Art

An orthogonal frequency-division multiplexing (OFDM) modulation method has recently attracted attention as a technique for realizing high speed wireless data transmission. There is a standard on a wireless transmission method employing a combination of the OFDM modulation system and frequency hopping for ultra wideband (UWB) communication, that is, MB-OFDM method (ISO/IEC 26907 High Rate Ultra Wideband PHY and MAC Standard).

In the OFDM modulation method, each of a plurality of data included in one symbol is divided into a large number of subcarriers (multicarriers). A set of data to be sent all together are called a symbol (or OFDM symbol) In the OFDM modulation method, using inverse Fourier, a plurality of subcarriers are transformed into a signal occupying a time region. The signal is modulated with a carrier wave and transmitted. The subcarriers are arranged equidistantly, while maintaining orthogonality, on a frequency axis.

An MB-OFDM system is known as a communication method employing the OFDM modulation system for ultra wideband (UWB) communication. In the MB-OFDM system, a frequency band of 528 MHz is called a band, and a bundle of a plurality of bands (in principle, 3 bands; 2 bands as an exception) is called a band group. In the MB-OFDM system, communication is performed while changing the central frequency of a carrier wave (performing hopping) for each single OFDM symbol or a plurality of symbols in one band, so that a band occupied by the subcarriers is changed.

More specifically, when each bands of one band group are denoted as band 1, band 2, and band 3, data is transmitted while changing the band occupied by the subcarrier. For each single OFDM symbol, the band occupied by the subcarriers to transmit the data is changed in following order: band 1→band 2→band 3→band 1 . . . . The operation of transmitting data with changing the band occupied by the subcarrier for each OFDM symbol is called frequency hopping.

FIG. 18 shows how data transmission is performed with hopping the carrier frequency in the MB-OFDM system. As shown in FIG. 18, a piconet A and a piconet B performing communication by using three bands 1, 2, and 3 are located close to each other. The piconet as referred to herein is a network configured by a master (host) and a slave (device). The piconet A has a hopping pattern that ascends obliquely to the right in the figure in the order of band 1→band 2→band 3 . . . , whereas the piconet B has a hopping pattern that descends obliquely to the right in the order of band 3→band 2→band 1 . . . . As shown in FIG. 18, in order to obtain a diversity effect on the receiver side, data of the same contents are diffused into two conjugate symbols and sent sequentially into a transmission channel. More specifically, one symbol A1 is transmitted consecutively in two cycles as two conjugate symbols (A1-1) and (A1-2).

Where the piconet A and piconet B perform communication by using the same frequency band (band 2) at the same time instant, as at a time T1 or time T2, the two symbols (A1-2) and (B1-2) undergo frame collision, and symbols (A1-2) and (B1-2) interfere with each other. As a result, a problem arising in an environment in which the piconet A and piconet B are close to each other is that quality of the received symbol is degraded. The symbol quality as referred to herein, for example, means the amount of noise contained in the symbol. Thus, where interference occurs because the symbol (A1-2) and symbol (B1-2) use the same band, the amount of noise contained in the symbol (A1-2) and symbol (B1-2) increases. Such interference between the piconets is called adjacent piconet interference.

Japanese Patent Application No. 2005-269392 discloses a receiver configured so as to compensate the degradation of symbols caused by such adjacent piconet interference. FIG. 19 is a block diagram illustrating a symbol combination circuit that combines symbols of the receiver described in Japanese Patent Application No. 2005-269392. A signal to noise ratio (SNR) measurement unit 101 measures signal quality of time-diffused symbols. In a weight determination circuit 102, a weighting factor W1 of a first symbol (A1-2) is set based on a signal quality (SNR1) of the first symbol (A1-1), and a weighting factor W2 of a second symbol (A1-2) is set based on a signal quality (SNR2) of the second symbol (A1-2) The first symbol (A1-2) and second symbol (A1-2) have the same content data. An SNR is a value representing the ratio of noise contained in the signal.

An adder 103 generates a combined symbol as received data by adding up a value obtained by multiplying the first symbol (A1-1) by the weighting factor W1 in a multiplier 104 and a value obtained by multiplying the second symbol (A1-2) by the weighting factor W2 in a multiplier 105. By thus determining the weighting factors W1, W2 correspondingly to signal quality of each symbol, it is possible, for example, to set a small weighting factor W2 for a symbol (A1-2) with poor signal quality and set a large weighting factor W1 for a symbol (A1-1) with good signal quality, thereby making it possible to reduce the effect of signal quality degradation caused by adjacent piconet interference.

Japanese Patent Application No. 2005-6116 discloses a combination method employing a receiver of a spatial diversity system in which single MB-OFDM symbols transmitted at the same timing are received by two antennas. With this method, the weighting factor of the symbol received by the first antenna and the weighting factor of the symbol received by the second antenna are set correspondingly to the signal quality of a subcarrier.

However, in the OFDM modulation system, the effects produced by the interference or noise on each subcarrier are not uniform. As a result, where the weighting factor is set for each symbol as in the receiver described in Japanese Patent Application No. 2005-269392, it will be impossible to generate an optimum combined symbol under a frequency selective fading environment in which signal quality changes for each frequency. This problem will be described below in greater detail with reference to FIG. 20.

FIG. 20 shows a normalized electric field intensity E (dB) (referred to hereinafter simply as "electric field intensity") of a plurality of subcarriers occupying the bands 1 to 3. In FIG. 20, a solid line represents an electric field intensity of a subcarrier occupying band 1, a dash-dot line represents an electric field intensity of a subcarrier occupying band 2, and a dot line represents an electric field intensity of a subcarrier occupying band 3.

A plurality of subcarriers are arranged equidistantly on a frequency axis in each band. More specifically, where a frequency gap between the subcarriers is denoted by m and a central frequency in each band is denoted by fn, the subcarriers are arranged in the order of . . . fn−2m, fn−1m, fn, fn+1m, fn+2m . . . . The electric field intensity representing the decrement of subcarrier amplitude differs between the bands. In FIG. 20, an electric field intensity of a subcarrier occupying a band with a central frequency f1, an electric field intensity of a subcarrier occupying a band with a central frequency f2, and an electric field intensity of a subcarrier occupying a band with a central frequency f3 are overlapped. In FIG. 20, the amplitudes attenuation received for each carrier in the bands is displayed by overlapping the central frequency of respective band. In other words, a region from the left end to the right end of a frequency axis in FIG. 20 is a frequency band of one band, and the frequency bands of bands 1 to 3 overlap at the central frequency on. The electric field intensity at a frequency f1+m of band 1, the electric field intensity at a frequency f2+m of band 2, and the electric field intensity at a frequency f3+m of band 3 are all shown as points on the frequency fn+m.

In a communication system with time diversity, the symbol is transmitted twice, while hopping the bands 1 to 3. Data of the symbol are transmitted by subcarriers occupying different bands on the same frequency shown in FIG. 20. The first symbol (A1-1) representing data contained in symbol A1 is transmitted by a subcarrier occupying band 1, and the second symbol (A1-2) representing data contained in the symbol A1 is transmitted by a subcarrier occupying band 2. Data constituting symbol A1 is transmitted twice with division between a subcarrier with a frequency f1+m and a subcarrier with a frequency f2+m.

The electric field intensity plotted against the ordinate does not depend on the contents of carried data. Therefore, the electric field intensity of the subcarrier can be estimated as a signal quality of the subcarrier itself. The electric field intensity is a power received by the receiver, and the estimation corresponds to good or poor signal quality when the electric field intensity is high or low, respectively.

In the conventional receiver (for example, see Japanese Patent Application No. 2005-269392), weighting factors of symbols are set based on signal quality of each symbol. In the conventional receiver, signal quality of the entire subcarrier carrying the symbol is determined for each symbol, and then weighting of the symbols is performed based on the signal quality of each symbol. For example, let us assume that the signal quality of the entire subcarrier occupying the band 1 is determined as "good' and the signal quality of the entire subcarrier occupying the band 2 is determined as "poor". In this case, a large weighting factor is set for the first symbol carried by the band 1 for which the signal quality is "good', and a small weighting factor is set for the second symbol carried by the band 2 for which the signal quality is "poor".

SUMMARY

The present inventors have found a problem that the quality of received signals differs between the bands occupied by the subcarriers contained in the received signals as shown in FIG. 20. It is clearly realized even from the amplitude information of the received signals. For example, looking at band 1, the electric field intensity is extremely low in point A, and the amplitude of the subcarrier having a frequency of point A in the band 1 is greatly reduced. On the other hand, looking at band 2, the electric field intensity of point B is high, and the amplitude of subcarrier having a frequency of point B in the band 2 is not reduced. The quality of received signal differs significantly depending on the band in which the subcarrier of the received signal is located. Under a frequency selective fading environment in which the electric field intensity changes for each frequency, the combination method of setting a weighting factor for each symbol, as in the conventional receiver, does not necessarily combines optimum reception data.

A first exemplary aspect of an embodiment of the present invention is a receiver comprises a subcarrier unit combination section that performs weighting corresponding to quality of each subcarrier with respect to each subcarrier relating to a received symbol, a symbol unit combination section that performs common weighting based on quality of the symbol with respect to each subcarrier, and a combination system switching unit that switches between use of the symbol unit combination section and the subcarrier unit combination section.

A second exemplary aspect of an embodiment of the present invention is a receiver comprises a subcarrier unit combination section that performs weighting corresponding to quality of each subcarrier with respect to each of the subcarriers relating to a received symbol.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 8 is a diagram showing a first symbol buffer and a second symbol buffer;

FIG. 9A is a diagram showing the processing performed by the symbol quality estimation and holding unit FIG. 9B is a diagram showing a relationship between a received signal and a noise;

DETAILED DESCRIPTION OF THE EXEMPLARY EMBODIMENTS

Figure 1:
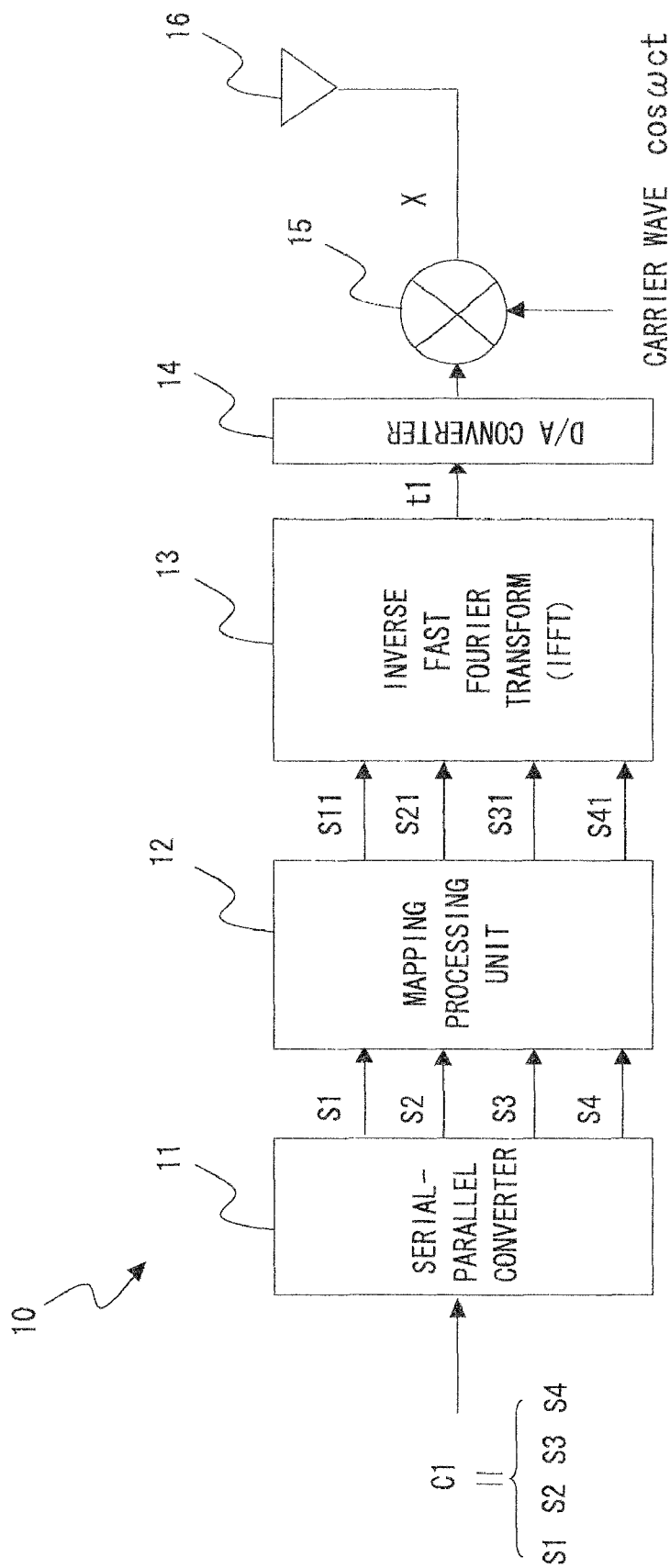
FIG. 1 is a diagram showing a schematic configuration of a transmitter 10 of the embodiment of the present invention.
Figure 2:
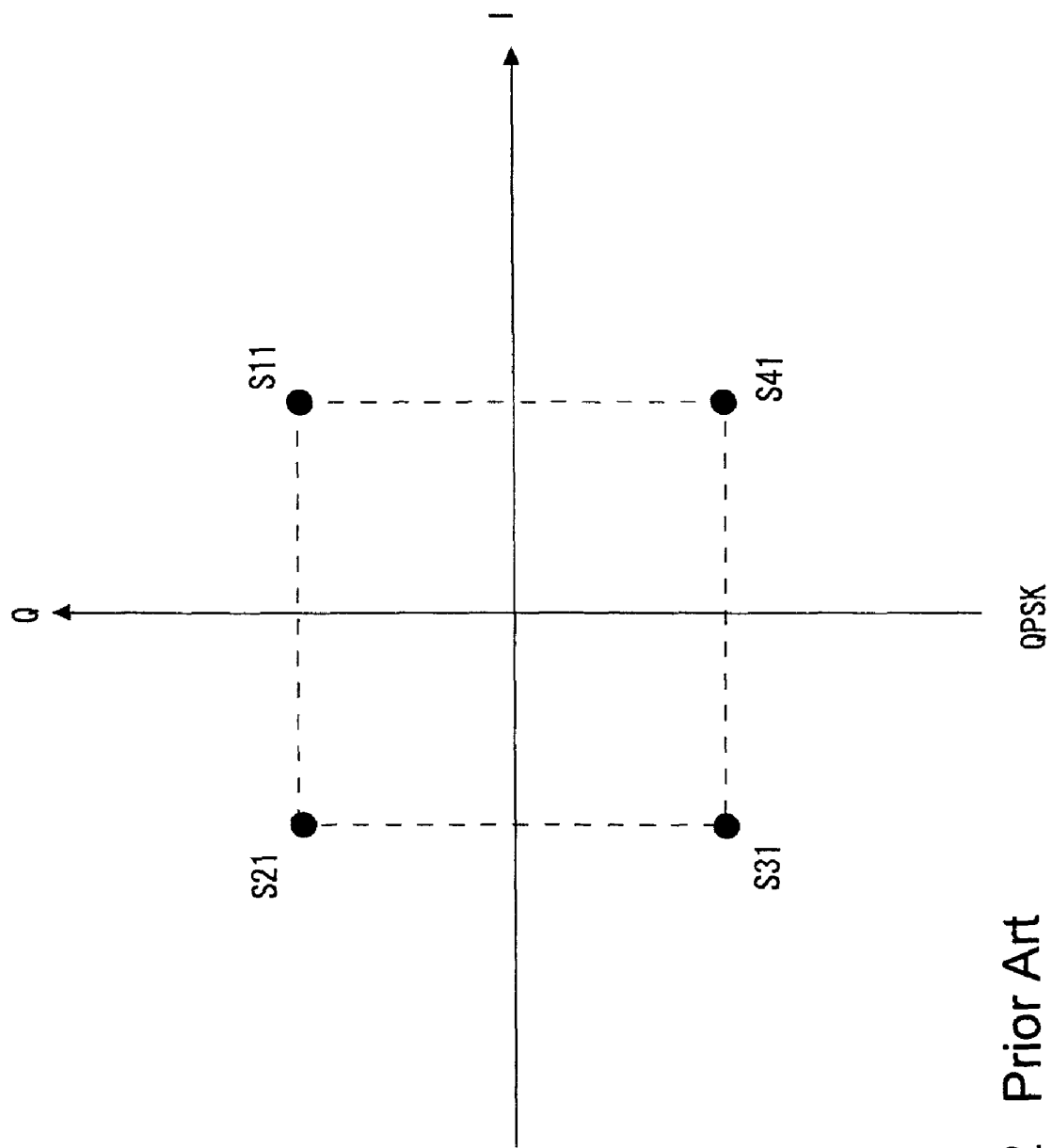
FIG. 2 is diagram showing a data mapping in Quadrature Phase Shift Keying (QPSK)

An embodiment of the present invention will be described below with reference to the appended drawings. FIG. 1 shows a schematic configuration of a transmitter 10 of the embodiment of the present invention. The reference symbol C1 in FIG. 1 stands for data of one symbol that has to be transmitted. The symbol C1 includes S1, S2, S3 and S4 which are transmitted data. These S1 to S4 are inputted in serial into a serial-parallel converter 11. More specifically, S1 to S4 can be, for example, two-bit data. The serial-parallel converter 11 outputs in parallel the S1 to S4, which have been inputted in serial, into a mapping processing unit 12. The mapping processing unit 12 performs digital modulation of the S1 to S4 inputted in parallel. Here, for example, Quadrature Phase Shift Keying (QPSK) will be assumed to be used. As shown in FIG. 2, the mapping processing unit 12 modulates the S1 to S4 into respective subcarriers S11, S21, S31, S41 having orthogonal frequency components.

The subcarriers S11 to S41 produced by digital modulation in the mapping processing unit 12 are outputted into the Inverse Fast Fourier Transform (IFFT) device 13. The inverse Fourier transformation device 13 combines the inputted subcarriers S11 to S41, generates a symbol t1 that is a signal of one time band, and outputs the generated symbol t1 into a D/A converter 14. The D/A converter 14 converts the inputted symbol t1 into an analog signal and outputs it to a multiplier 15. The multiplier 15 multiplies the inputted analog signal by a carrier wave $\cos \omega_c t$, subjects the analog signal of the symbol t1 to analog modulation and outputs the modulated signal X to an antenna 16. The frequency conversion—up-conversion processing is described hereinbelow as "analog modulation". The antenna 16 transmits the modulated signal X to the outside. The carrier frequency (described hereinbelow as "frequency") that modulates the symbol t1, which is the combination result of subcarriers S11 to S41, is denoted by fc1.

Figure 3:
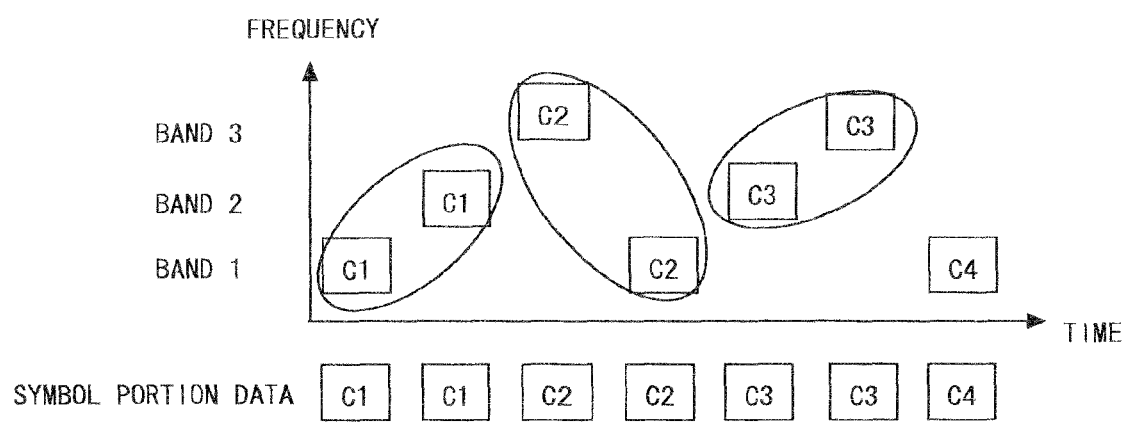
FIG. 3 is diagram showing a schematically the relevant frequency hopping.

The transmitter 10 is assumed to retransmit the C1, which is the data of one symbol, by changing the carrier frequency. That is, the symbol C1 is time diffused by frequency hopping. The subcarriers used in transmitting the symbol C1 second time will be represented by S12, S22, S32, and S42. The time band signal outputted upon combining S12 to S42 in the inverse Fourier transformation device 13 is taken as symbol t2. The symbol t2 is converted into an analog signal by the D/A converter 14 and subjected to analog modulation by the multiplier 15. The frequency at which the analog signal of the symbol t2 is modulated is denoted by fc2. After the data C1 of one symbol have been transmitted twice, the C2 is likewise transmitted twice with different carrier frequencies, and then C3, C4, ... are similarly transmitted two times. FIG. 3 shows schematically the relevant frequency hopping. It is clear that respective data of one symbol are subjected to analog modulation at different carrier frequencies and transmitted two times. To simplify the explanation, the operation of transmitting the data C1 of one symbol two times will be assumed as a specific example, and only cases with subcarriers S11 to S41 and S12 to S42 will be considered as specific examples.

Figure 4:
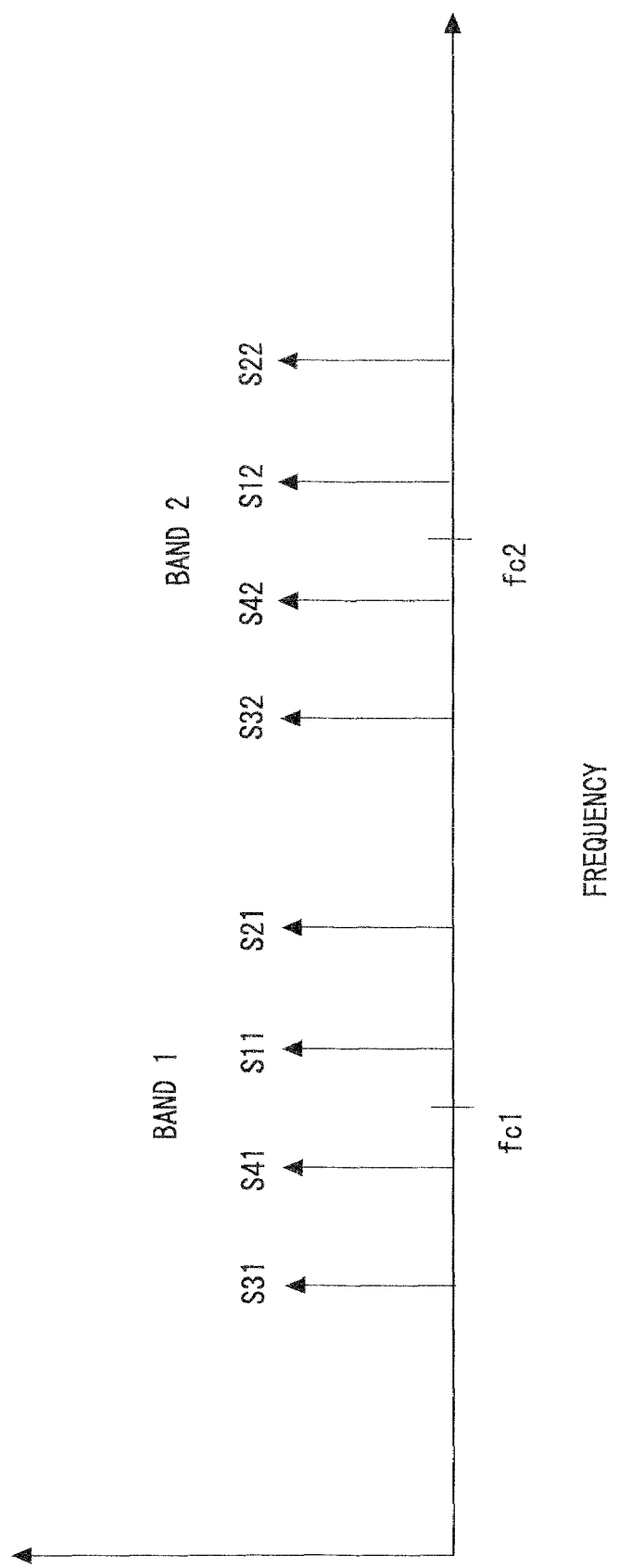
FIG. 4 is diagram showing a position relationship on a frequency axis of subcarriers S11 to S41.

The subcarriers S11 to S41 and S12 to 42 will be described below in greater details FIG. 4 shows a position relationship on a frequency axis of subcarriers S11 to S41 including the symbol t1 modulated by a carrier wave having a frequency fc1 and subcarriers S12 to S42 including the symbol t2 modulated by a carrier wave having a frequency fc2. The mapping processing unit 12 shown in FIG. 1 uses the QPSK as digital modulation and performs mapping of the transmitted signals. In the first transmission, S1 is mapped to S11, S2-to S21, S3-to S31, and S4-to S41. In the second transmission, S1 is mapped to S12, S2-to S22, S3-to S32, and S4-to S42. For example, the subcarriers S11 to S41 are subjected to inverse Fourier transformation. As a result, the subcarriers S11 to S41 have orthogonal frequency components and are equidistantly arranged on the frequency axis. In this way, the subcarriers S11 to S41 are analog modulated.

When the subcarriers S11 to S41 are modulated by the carrier wave fc1, the arrangement thereof has the frequency fc1 as a center. On the other hand, when the subcarriers S12 to S42 positioned in the band 2 use the carrier wave fc2 during transmission of a time band signal, the arrangement thereof on the frequency axis has the frequency fc2 as a center. In the explanation of the present embodiment, in order to facilitate the understanding, the mapping processing unit 12 will be assumed to modulate the subcarriers S11 and S12, S21 and S22, S31 and S32, and S41 and S42 at the same respective frequencies. Actually, the mapping processing unit 12 can modulate the subcarriers S11 and S12, S21 and S22, S31 and S32, and S41 and S42 at different frequencies.

Figure 5:
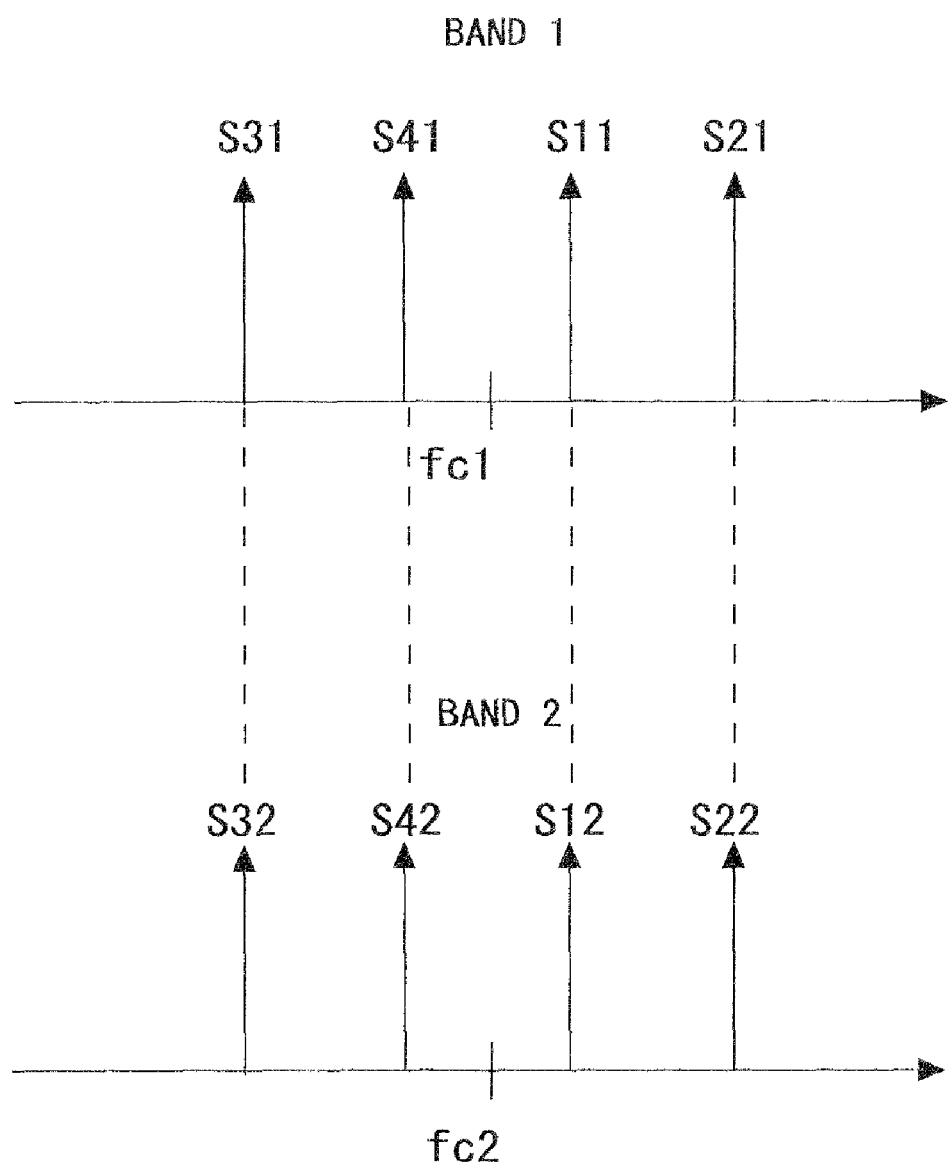
FIG. 5 is a diagram showing a relationship between a band 1 and a band 2.

In FIG. 5, the band 1 occupied by subcarriers S11 to S41 and the band 2 occupied by subcarriers S12 to S42 are shown in the vertical arrangement in which they overlap at central frequencies fc1, fc2. There is a one-to-one correspondence between the subcarriers S11 to S41 of the band 1 and subcarriers S12 to S42 of the band 2, and identical bit data are carried by the corresponding subcarriers.

Figure 6:
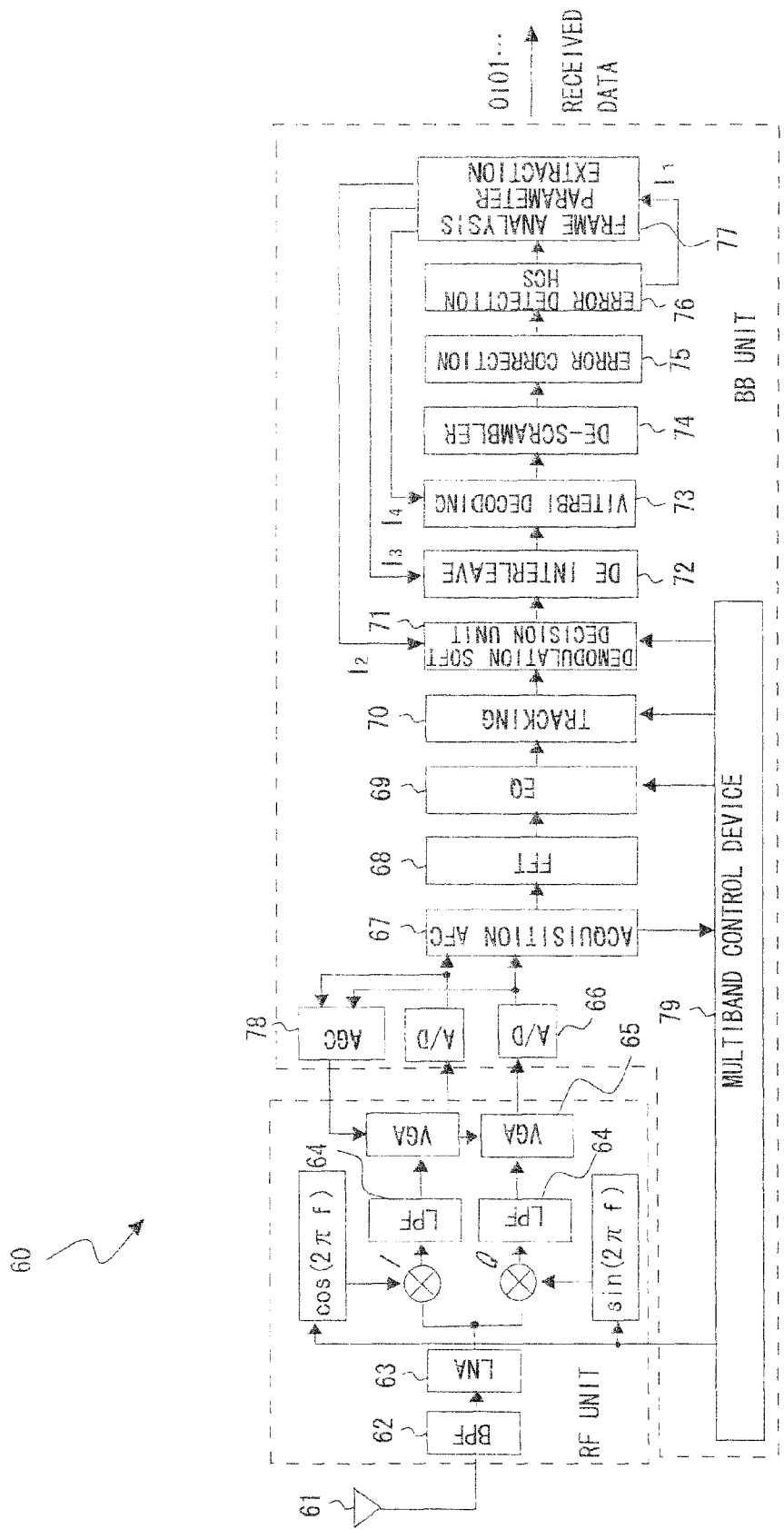
FIG. 6 is a diagram showing a configuration of a receiver 60 of the present embodiment.

FIG. 6 shows a receiver 60 of the present embodiment. A signal transmitted by the transmitter 10 is received by an antenna 61 and outputted to a Band Pass Filter (BPF) 62. The BPF 62 is a filter that performs band restriction so that only the signals of the desired band, from among the received signals, are processed. The signals extracted by the BPF 62 are outputted to a Low Noise Amplifier (LNA) 63. When the received signal is very weak, the received signal is amplified by the LNA 63 to facilitate the processing thereof. The signal amplified by the LNA 63 is converted into a base band by a direct conversion method and then inputted in a Low Pass Filter (LPF) 64. Because the central frequency is changed by hopping at all times, the central frequency is changed following the control from a multiband control device 79. The base band signal is subjected to adjustment processing of variability gain amplifier (VGA) 65 and then inputted in an Analog to Digital (A/D) converter 66. By measuring the power of the received signal and adjusting the VGA 65 (Automatic Gain Control (AGC) processing), it is possible to employed the dynamic range of A/D effectively. The A/D converter 66 converts the received signal into a digital signal and outputs it to an acquisition Automatic Frequency control (AFC) device 67 performing a carrier sense processing and the like.

The acquisition AFC device 67 implements the correction of frequency error between the transmitter and receiver or a carrier sense processing. Further, the acquisition AFC device 67 instructs the multi band control device 79 so that the hopping processing be performed at a timing confirmed by the carrier sense. The acquisition AFC device 67 outputs the processed signal to a Fourier transformation device 68, and the Fast Fourier Transform device (FFT) 68 transforms the input signal, which is a time zone signal, into a frequency zone signal. Thus, the transformation is performed for each subcarrier included in the input signal. The Fourier transformation device 68 outputs the signal for each subcarrier to an Equalizer (EQ) device 69. The EQ device 69 corrects the transmission route characteristic of each received subcarriers and then outputs the signal to a tracking unit 70. The tracking unit 70 corrects the effect produced by the residual frequency difference of phase distortion. The tracking unit 70 outputs the processed signal into a demodulation soft determination unit 71.

The demodulation soft determination unit 71 performs a de-mapping processing of a soft determination type. A de-interleaver 72 rearranges the received signals in the order of the signals transmitted by the transmitter. A Viterbi decoder 73 implements an error correction processing with a Viterbi decoder and improves the reception characteristic. A de-scrambler 74 performs a descrambling processing. An error correction device 75 performs error correction processing by Read-Solomon encoding-decoding. An error detection HCS device 76 performs HCS (Header Check Sequence) by CRC (Cyclic Redundancy Check) polynome and detects an error. A frame in which an error has been detected by the error detection HCS device 76 is discarded. Once the error detection Header Check Sequence (HCS) device 76 detects an error, a discard indication signal $I_1$ is outputted so that the frame in which the error has been detected with respect to a frame analysis parameter extraction device 77 is discarded.

The frame analysis parameter extraction device 77 indicates ($I_2$) a demodulation system (QPSK, 16 QAM, etc.) of payload from the analysis results of the header frame to the demodulation soft determination unit 71. The frame analysis parameter extraction device 77 indicates ($I_3$) an interleave parameter (depth etc.) of the payload from the analysis results of the header frame to the de-interleaver 72. The frame analysis parameter extraction device 77 indicates ($I_4$) a convolution code parameter (encoding rate, restriction length, etc.) from the analysis results of the header frame to the Viterbi decoder 73. As a result, decoded received data are outputted from the frame analysis parameter extraction device 77.

Figure 7:
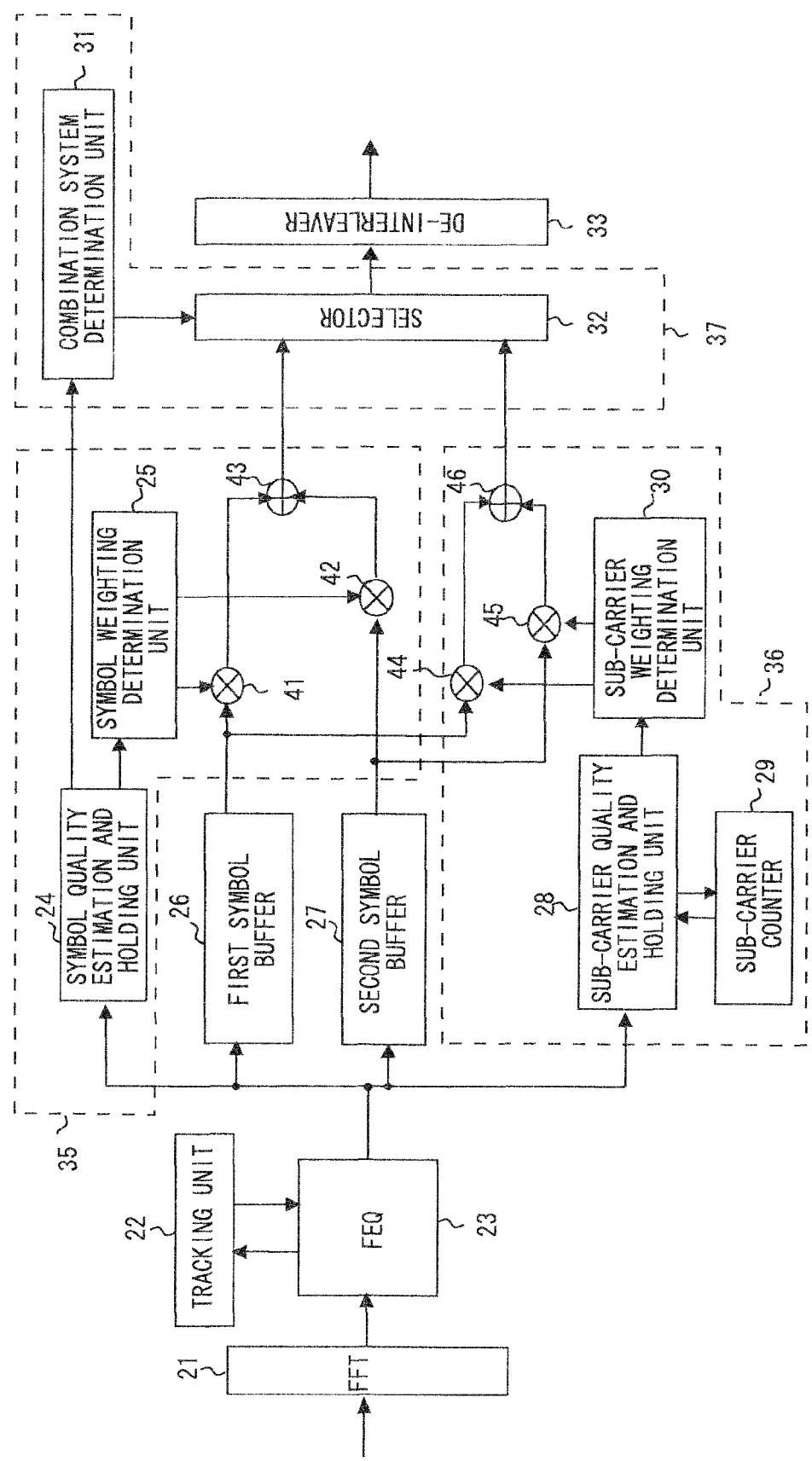
FIG. 7 is a diagram showing a part of the receiver 60 of the present embodiment.

FIG. 7 shows part of the receiver 60 of the present embodiment. More specifically, a FFT 21 corresponds to the Fourier transformation device 68 shown in FIG. 6, and a FEQ 23 corresponds to the EQ device 69 shown in FIG. 6. Devices other than the FEQ 23 shown in FIG. 7 (except the de-interleaver) correspond to the demodulation soft determination unit 71 shown in FIG. 6. The receiver of the present embodiment includes a subcarrier unit combination section 36 that performs weighting corresponding to quality of each subcarrier with respect to each subcarrier relating to the received symbol, a symbol unit combination section 35 that performs common weighting based on symbol quality with respect to each subcarrier, and a combination system switching unit 37 that switches between the use of the symbol unit combination section 35 and the use of the subcarrier unit combination section 36. The symbol unit combination section 35 receives the diffused first and second symbols and computes the quality of the first and second symbols. In the demodulation soft determination unit 71, the combination system switching unit 37 determines which section is used between the use of the symbol unit combination section 35 and the use of the subcarrier unit combination section 36 based on the difference in quality between the first and second symbols.

The combination system switching unit 37 includes a combination system determination unit 31 that controls between the use of the symbol unit combination section 35 and the use of the subcarrier unit combination section 36 based on the symbol quality. The combination system determination unit 31 switches the use of the symbol unit combination section 35 and the subcarrier unit combination section 36, for example, based on the SNR of the received first symbol Each structural unit of the apparatus shown in FIG. 7 and operation thereof will be described below. For specific explanation, a case will be first considered in which the symbol t1 is inputted in the FFT 21. The FFT 21 subjected the symbol t1 to Fourier transformation and transforms it into a frequency band signal. Thus, the FFT 21 transforms the symbol t1 into subcarriers S11 to S41 The FFT 21 outputs the subcarriers S11 to S41 in parallel. The subcarriers are subjected to the above-described processing in the FEQ 23 and tracking unit 22 and then outputted in parallel from the FEQ 23.

A first symbol buffer 26 holds the inputted subcarriers S11 to S41. This is illustrated by FIG. 8. On the other hand, as shown in FIG. 8, a second symbol buffer 27 serves to hold the subcarriers S12 to S42 included in the inputted symbol t2. The first and second symbol buffers output in parallel the subcarriers held therein.

On the other hand, a symbol quality estimation and holding unit 24 also inputs the subcarriers S11 to S41 included in the symbol t1. This is shown in FIG. 9A. The symbol quality estimation and holding unit 24 computes the Signal to Noise Ratio (SNR) included in the received subcarriers S11 to S41. FIG. 9B illustrates the processing performed by the symbol quality estimation and holding unit 24. As shown in FIG. 9B, the symbol quality estimation and holding unit 24 finds a noise component of each subcarrier on the basis of changes from the transmitted signal component and received signal component serving as references. The SNR of each subcarrier is converted into an SNR relating to the symbol t1 and outputted. As shown in FIG. 7, the symbol quality estimation and holding unit 24 outputs the SNR relating to the symbol t1 to a symbol weighting determination unit 25 and combination system determination unit 31. When the symbol t2 is received, the symbol quality estimation and holding unit 24 outputs an SNR relating to the symbol t2 in a similar manner. In the present embodiment, the signal computed and outputted by the symbol quality estimation and holding unit 24 is defined as signal quality for each symbol.

Figure 10:
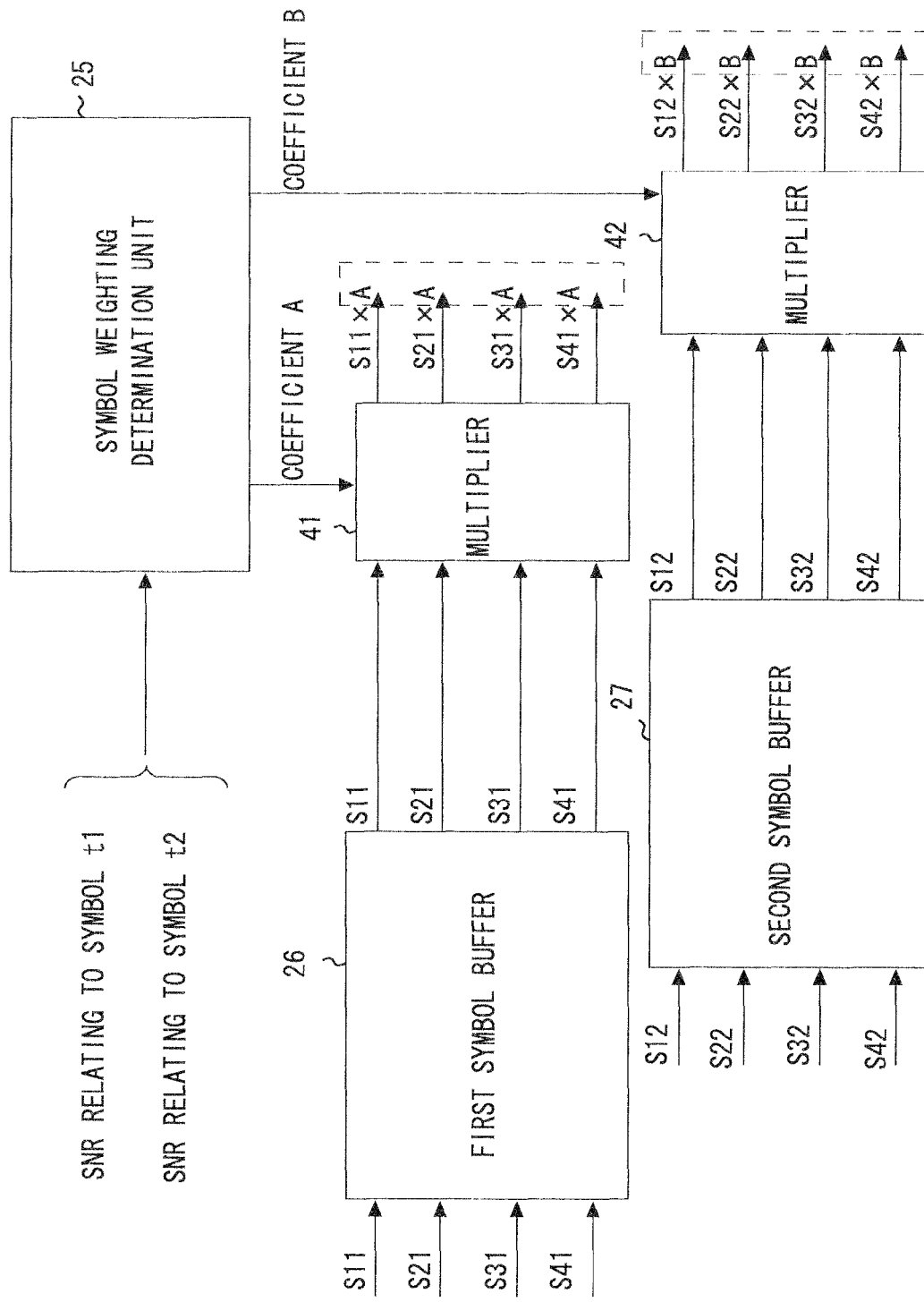
FIG. 10 is a diagram showing a processing in the symbol weighting determination unit.

The SNR relating to the symbol t1 is inputted in the symbol weighting determination unit 25. The SNR relating to the symbol t2 is also inputted in the symbol weighting determination unit 25. This is illustrated by FIG. 10. The symbol weighting determination unit 25 into which the SNR relating to the symbol t1 and the SNR relating to the symbol t2 have been inputted determines weighting factors for the symbol t1 and symbol t2. For example, when the symbol weighting determination unit 25 determines based on the SNR relating to the symbol t1 that large noise is admixed to the symbol t1, but practically no noise is admixed to the symbol t2, the symbol weighting determination unit determines a small factor A corresponding to the noise amount for the symbol t1 and sets a large factor B for the symbol t2. For example, let us consider the simplest case in which the factor A for the symbol t1 is taken as 0, and the factor B for the symbol t2 is taken as 1. In this case, the symbol t1 to which a large amount of noise has admixed, whereby the SNR has been degraded, can be considered to interfere with other symbols. The aforementioned adjacent piconet interference is an example of such interference. The relation between the factor A and factor B may be such that the sum thereof is 1.

A multiplier 41 receives the subcarriers S11 to S41 outputted by the first symbol buffer 26, also receives the factor A outputted by the symbol weighting determination unit 25, and performs the multiplication processing thereof. More specifically, the multiplier 41 multiplies the S11 to S41 by the same factor A and outputs the multiplication results. The factor A relating to the symbol t1 and determined by the symbol weighting determination unit 25 is a common weighting factor for the subcarriers S11 to S41 included in the symbol t1. On the other hand, a multiplier 42 receives the subcarriers S12 to S42 outputted by the second symbol buffer 27, also receives the symbol weighting factor B, and performs the multiplication. More specifically, the multiplier 42 multiplies the S12 to S42 by the same factor B and outputs the multiplication results. Thus, the symbol weighting factor B is a common weighting factor for the subcarriers S12

Figure 11:
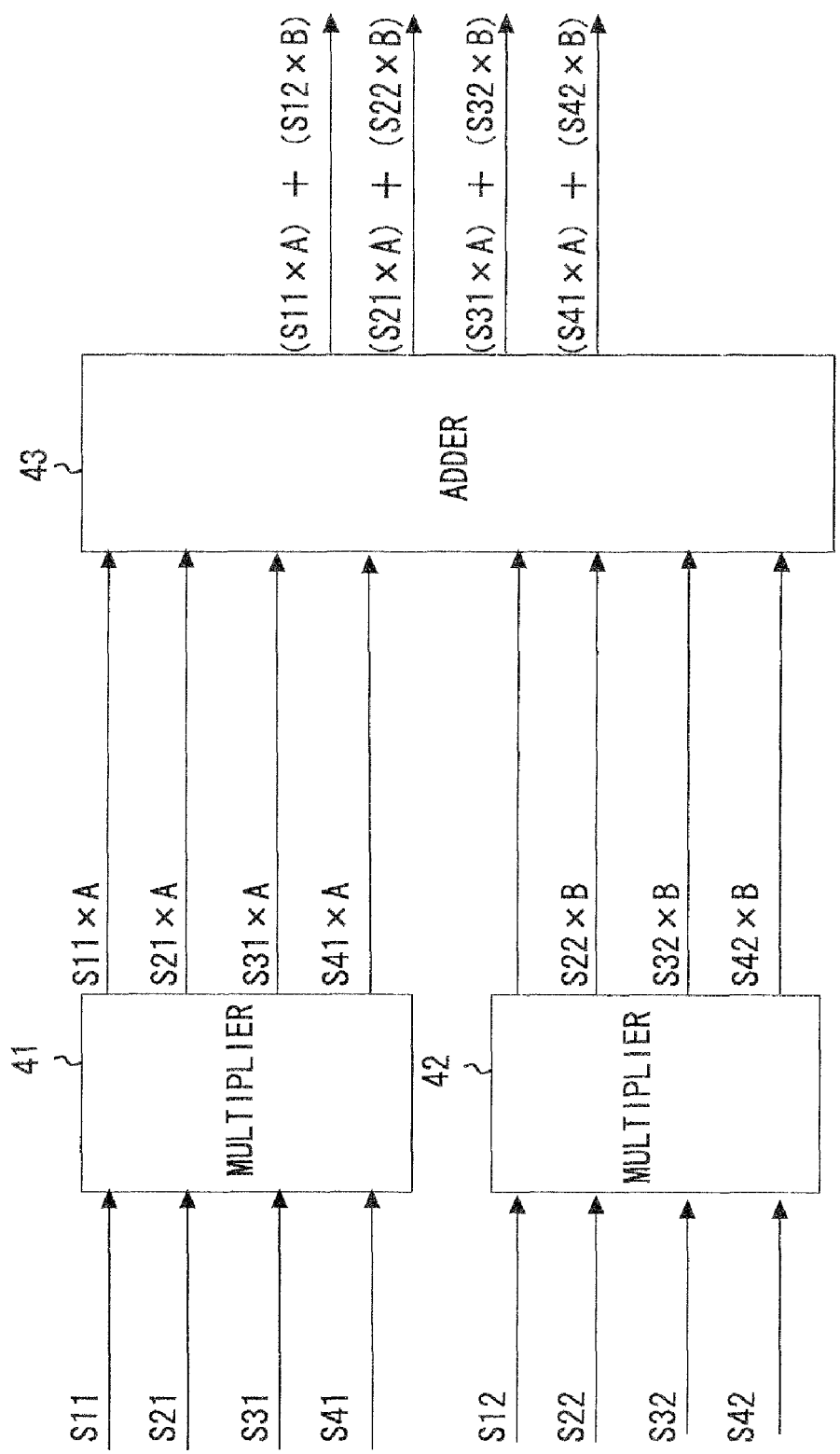
FIG. 11 is a diagram showing the operation of an adder.

FIG. 11 illustrates the operation of an adder 43. The adder 43 performs an addition processing of signals outputted by the above-described multiplier 41 and multiplier 42, that is, of weighted subcarriers. More specifically, the adder 43 adds up the corresponding subcarriers that have been multiplied by the weighting factors, from among the subcarriers included in the symbol t1 and symbol t2, and outputs in parallel the sum obtained. FIG. 11 illustrates such an addition processing.

Figures 12A, 12B:
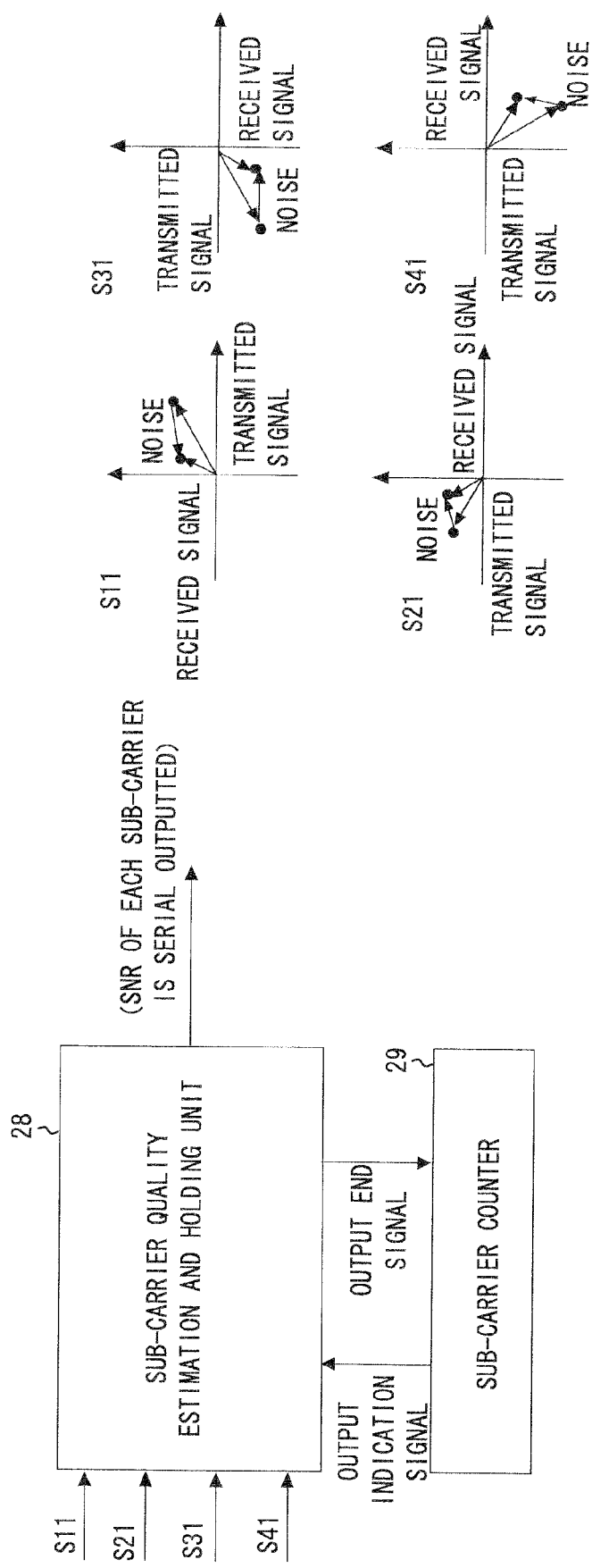
FIG. 12A is a diagram showing the input signals and output signals of a subcarrier quality estimation and holding unit and a subcarrier counter.
FIG. 12B is a diagram showing a relationship between a received signal and a noise.

FIG. 12A shows the input signals and output signals of a subcarrier quality estimation and holding unit 28 and a subcarrier counter 29. FIG. 12B shows the operation performed by the subcarrier quality estimation and holding unit 28. The subcarriers S11 to S41 are similarly inputted in parallel into the subcarrier quality estimation and holding unit 28. The subcarrier quality estimation and holding unit 28 computes the SNR for the subcarriers S11 to S41. More specifically, as shown in FIG. 12B, the subcarrier quality estimation and holding unit computes a noise amount of each subcarrier on the basis of changes from the transmitted signal component and received signal component serving as references and computes the SNR. After the computation of SNR of the subcarriers S11 to S41 has been completed, the subcarrier quality estimation and holding unit 28 first outputs, for example, the SNR 11, which is the SNR of the S11, and also outputs an SNR 11 outputted signal to the subcarrier counter. The subcarrier counter 29 into which the SNR 11 outputted signal has been received counts up the count value from the initial value and outputs a signal indicating the value after such count-up as an output indication signal into the subcarrier quality estimation and holding unit 28.

The subcarrier quality estimation and holding unit 28 into which the output indication signal has been received outputs, for example, an SNR 21, which is the SNR of the S21, and also outputs SNR 21 outputted signal to the subcarrier counter. The signals are exchanged in the same manner between the subcarrier quality estimation and holding unit and subcarrier counter, and the subcarrier quality estimation and holding unit outputs the SNR 11 to SNR 41, which are the SNR of subcarriers S11 to S41. The SNRs 11 to 41 are outputted to a subcarrier weighting determination unit. In the example described hereinabove, subcarriers S11 to S41 relating to the symbol t1 are considered, but similar operations are also performed when the subcarriers S12 to S42 relating to the symbol t2 are inputted into the subcarrier quality estimation and holding unit.

Figure 20:
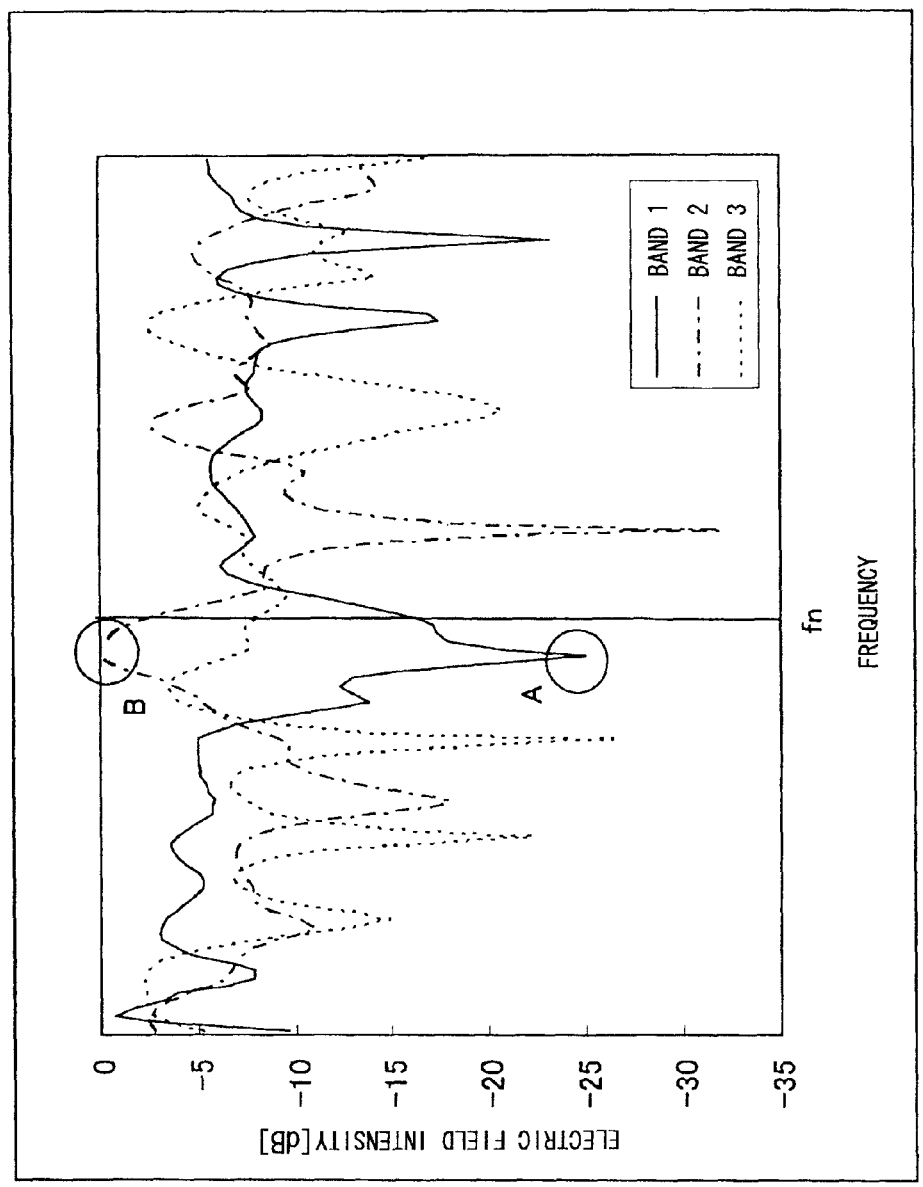
FIG. 20 is a normalized electric field intensity E (dB) (referred to hereinafter simply as "electric field intensity") of a plurality of subcarriers occupying the bands 1 to 3.

As described hereinabove, the reception characteristic of the subcarriers differs depending on the frequency onto which the mapping has been performed in the transmitter. In the explanation relating to the present embodiment, digital modulation is performed such that the S11 and S12, S21 and S22, S31 and S32, and S41 and S42 from among the subcarriers included in the symbol t1 and symbol t2, have the same frequency components. However, in the symbol t1 and symbol t2, the frequencies of the carrier wave are different (fc1 and fc2, respectively). Therefore, as shown in FIG. 20, the S11 and S12, S21 and S22, S31 and S32, and S41 and S42 have different reception characteristics.

With this fact in view, in the present embodiment, the subcarrier quality estimation and holding unit 28 computes the SNR relating to each subcarrier contained in the symbol t1 and symbol t2. The computation result is defined as quality of each subcarrier. A method of using a power of each subcarrier or an SNR, or a power found from respective values of the subcarriers that have been thinned out to reduce the computation volume as the quality of each subcarrier can be also considered. It is also possible to estimate the signal quality in several subcarrier units and perform the weighting processing for each subcarrier.

Figure 13:
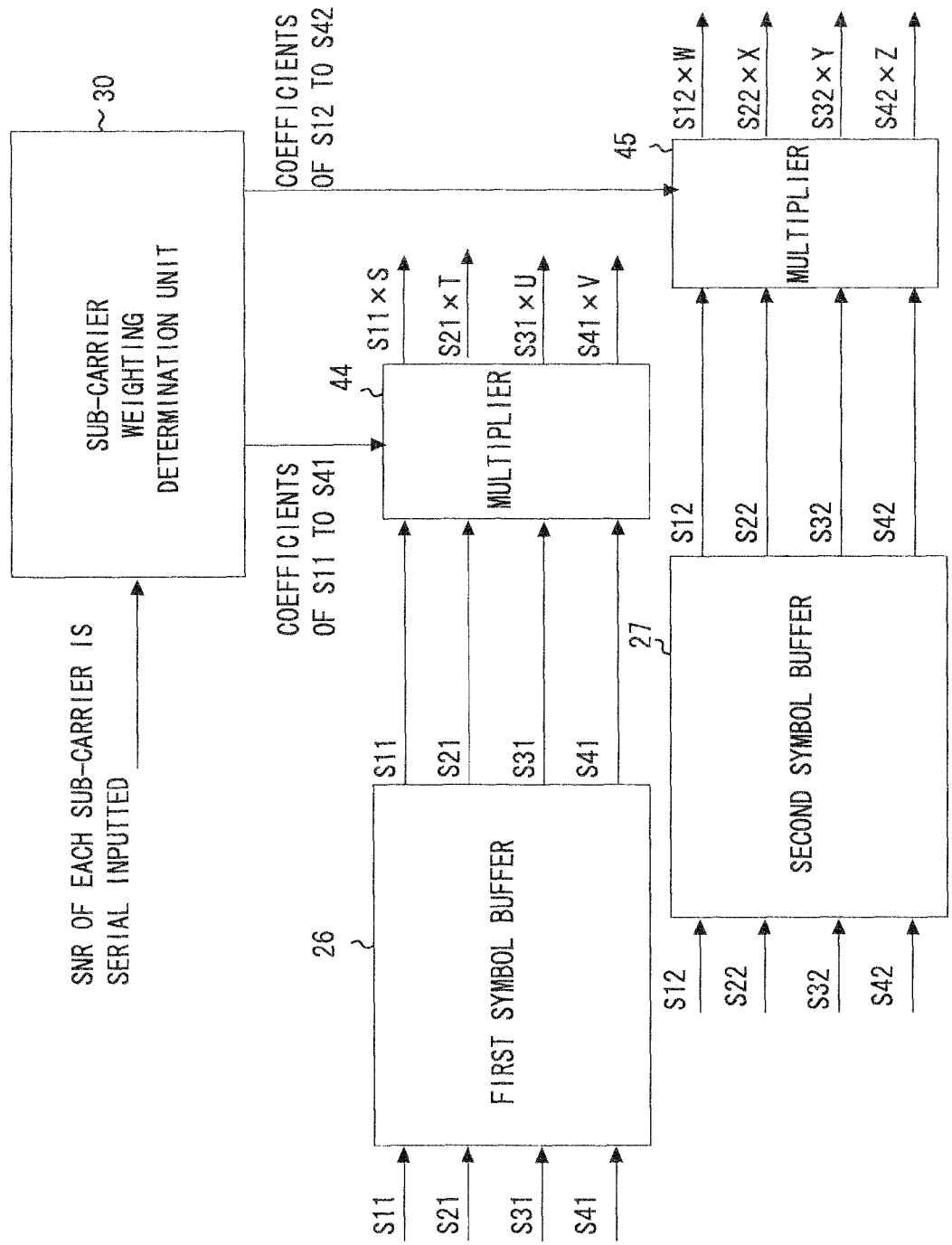
FIG. 13 is a diagram showing a processing in a subcarrier weighting determination unit.

FIG. 13 illustrates a processing in which a subcarrier weighting determination unit 30 determines a weighting factor for each subcarrier and a processing in which a multiplier 44 and a multiplier 45 multiply each subcarrier by the weighting factor of each subcarrier. The subcarrier weighting determination unit 30 receives the SNR corresponding to each subcarrier relating to the symbol t1. The subcarrier weighting determination unit 30 determines the weighting factor based on each SNR. More specifically, the subcarrier weighting determination unit 30 receives the SNR 11, which is the SNR relating to the S11, and determines a weighting factor S corresponding to the S11. Further, the subcarrier weighting determination unit 30 inputs the SNR 21, which is the SNR relating to the S21, and determines a weighting factor T relating to the S21.

The subcarrier weighting determination unit 30 determines a weighting factor U relating to the S31 and a weighting factor V relating to the S41 in a similar manner. Further, the subcarrier weighting determination unit 30 also receives SNR of each subcarrier relating to the symbol t2, that is, SNR 12 to SNR 42. The subcarrier weighting determination unit 30 similarly determines a weighting factor W relating to the S12, a weighting factor X relating to the S22, a weighting factor Y relating to the S32, and a weighting factor Z relating to the S42. The subcarrier weighting determination unit 30 then outputs the determined weighting factors S, T, U and V to the multiplier 44 and outputs the weighting factors W, X, Y and Z to the multiplier 45.

On the other hand, the first symbol buffer 26 holds the subcarriers S11 to S41 relating to the symbol t1 and then outputs them to the multiplier 44. Likewise, the second symbol buffer 27 holds the subcarriers S12 to S42 relating to the symbol t2 and then outputs them to the multiplier 45. The multiplier 44 into which the subcarriers S11 to S41 and weighting factors S, T, U and V have been inputted multiplies the subcarrier S11 by the factor S, multiplies the subcarrier S21 by the factor T, multiplies the subcarrier S31 by the factor U, and multiplies the subcarrier S41 by the factor V. Then, the multiplier 44 outputs the multiplication results, for example, in parallel. The multiplier 45 into which the subcarriers S12 to S42 and weighting factors W, X, Y and Z have been inputted multiplies the subcarrier S12 by the factor W, multiplies the subcarrier S22 by the factor X, multiplies the subcarrier S32 by the factor Y, and multiplies the subcarrier S42 by the factor Z. The multiplier 45 outputs the multiplication results, for example, in parallel. The factors S and W, T and X, U and Y, and V and Z are so related that the sum of each pair is 1.

The subcarrier weighting determination unit 30 sets a weighting factor individually for each subcarrier, and the multiplier 44 and multiplier 45 multiply individual weighting factors by the respective subcarriers. This processing is different from that performed by the symbol weighting factor determination unit 25 and multipliers 41, 42 that receive the output thereof. Thus, in the present embodiment, not only a weighting factor is set for each symbol, but also a weighting factor is set for each subcarrier based on the quality of the respective subcarrier.

Figure 14:
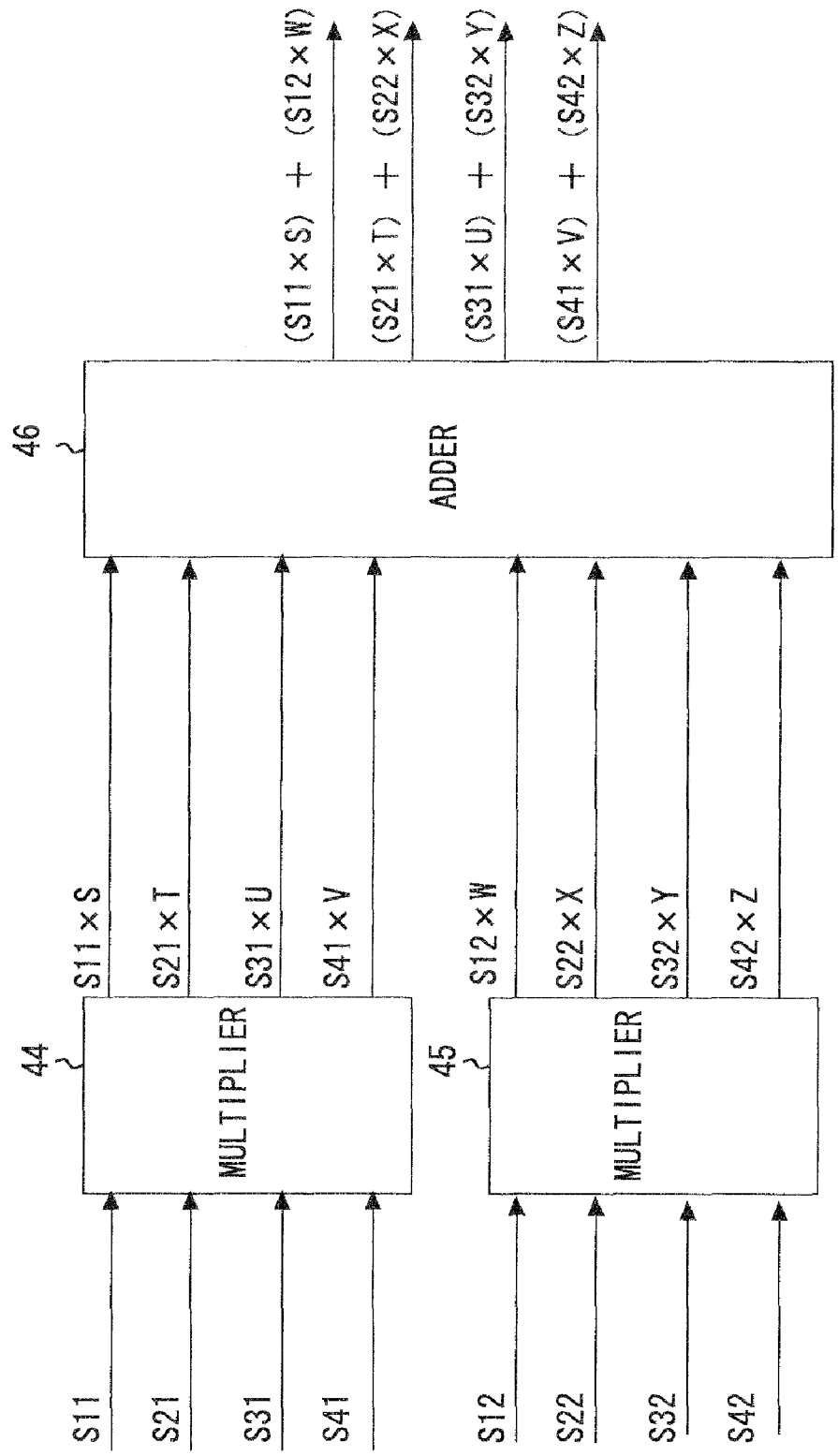
FIG. 14 is a diagram showing an operation of an adder.

FIG. 14 illustrates the operation of an adder 46. The adder 46 inputs the outputs of the multiplier 44 and multiplier 45. Then, the adder 46 performs the addition processing. The adder 46 outputs the addition results in parallel. The output result of the adder 46 is a combined signal obtained by weighting the one-symbol data C1 transmitted in symbol t1 and symbol t2 by a value of the SNR of each subcarrier contained in the symbol t1 and symbol t2, that is, by weighting generally based on quality.

Figure 15:
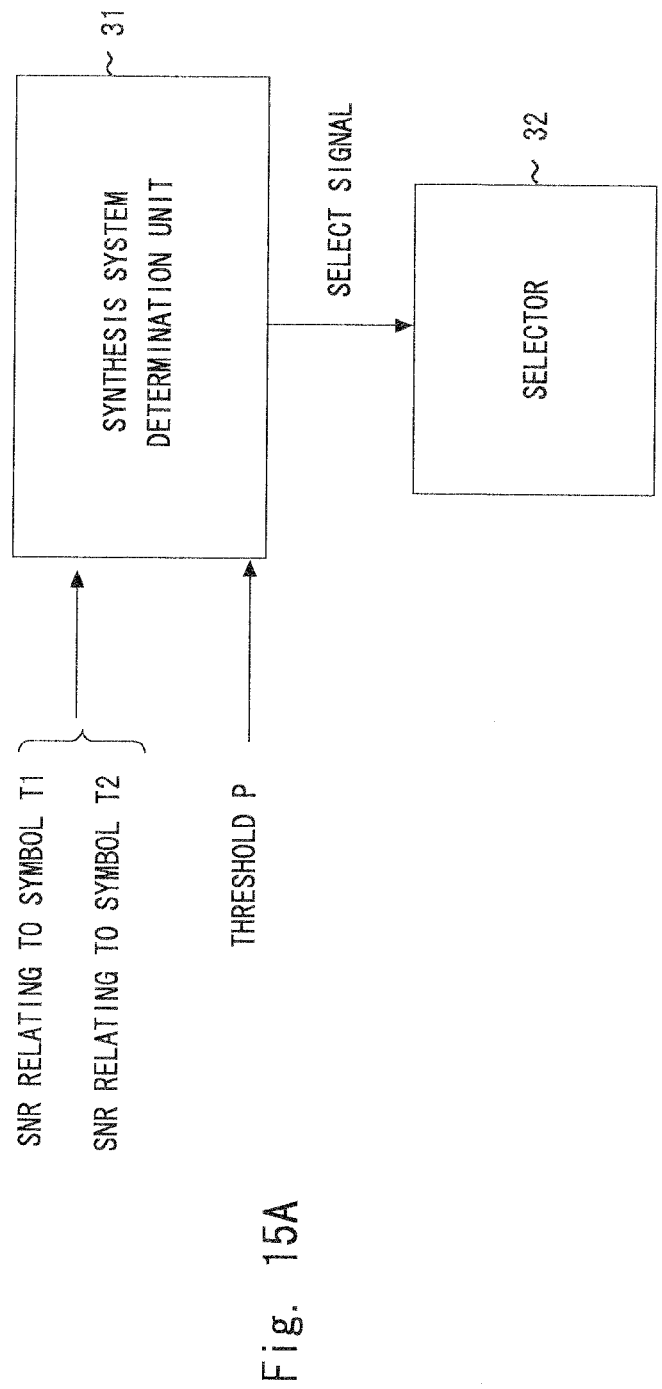
FIGS. 15A and 15B are diagrams showing an operation of the combination system determination unit.

FIG. 15A and FIG. 15B illustrate the operation of the combination system determination unit 31. First, the combination system determination unit 31 receives the SNR relating to the symbol t1 and the SNR relating to the symbol t2 outputted by the symbol quality estimation and holding unit 24, as shown in FIG. 15A. Then, a threshold P is received in the symbol quality estimation and holding unit 24. The threshold P may be inputted from an external register, or may be set based on the SNR relating to the symbol t1 and the SNR relating to the symbol t2 received by the combination system determination unit 31. The combination system determination unit 31 finds an absolute value of a difference between the SNR relating to the symbol t1 and the SNR relating to the symbol t2, as shown in FIG. 15B and determines whether the absolute value of the difference is larger than a predetermined threshold or equal to or lower than the threshold.

When the difference is larger than the threshold, it indicates that a large amount of noise is admixed to either the symbol t1 or the symbol t2. In this case, there is a high probability of the symbol t1 or symbol t2 interfering with the other symbol. Therefore, the combination system determination unit 31 sends a selector signal to a selector 32 so as to output a symbol weighted by the weighting factor determined by the symbol weighting factor determination unit 25. On the other hand, when the absolute value of the difference between the SNR relating to the symbol t1 and the SNR relating to the symbol t2 is small, the combination system determination unit 31 sends a selector signal to the selector 32 so as to output a symbol weighted by the weighting factor determined by the subcarrier weighting determination unit 30.

Figure 16:
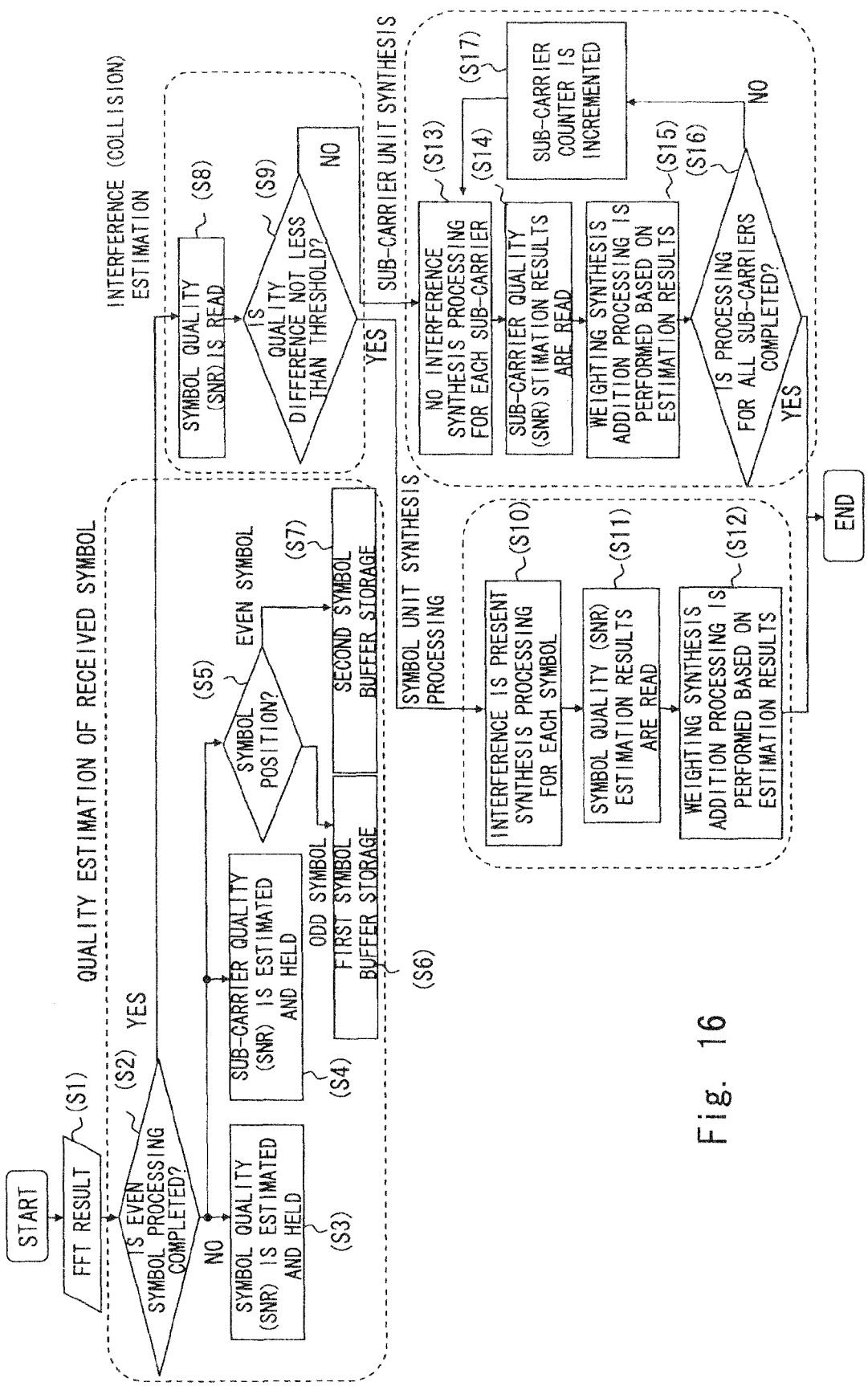
FIG. 16 is a sequence diagram illustrating an operation of the receiver.

FIG. 16 is a sequence diagram illustrating the operation of the receiver of the embodiment of the present invention. A signal received by the antenna is subjected to discrete Fourier transformation by the FFT 16 (S1). As a result, the received signal is converted into data having amplitude and phase information of each subcarrier. The received symbol is continuously outputted to the symbol quality estimation and holding unit 24 and subcarrier quality estimation and holding unit 28 till the signal processing of the symbols in which identical data have been diffused is completed (S3, S4) It is then determined whether the received symbol is an odd symbol or an even symbol (S5), and if the received symbol is an odd symbol, this symbol is stored in the first symbol buffer 26 (S6). If the received symbol is an even symbol, it is stored in the second symbol buffer 27 (S7). Referring to the above-described examples of specific explanation of receiver configurations, the odd symbol means the symbol t1, and the even symbol means the symbol t2.

If the signal quality estimation and storage of the even signal are completed in step S2, the signal quality of the symbol determined by the symbol quality estimation and holding unit 24 is read out (S8). Then, it is determined whether a difference in signal quality between a first symbol (for example, symbol t1) and a second symbol (for example, symbol t2) in which identical data have been diffused is above a threshold (S9). If the difference in signal quality between the first symbol and second symbol is equal to or higher than the threshold, it is determined that the received symbol has been affected by interference, and combination processing of each symbol is started (S10). In the combination processing in symbol units, the signal quality (for example, SNR) of each symbol estimated and held by the symbol quality estimation and holding unit 24 is read out (S11). Then, a weighting factor for each symbol is set based on the estimation results read out from the symbol quality estimation and holding unit 24 and weighting is performed (S12) As a result, a combined symbol that has been combined in symbol units is generated.

On the other hand, when the difference in signal quality between the first symbol and second symbol in step S9 is equal to less than the threshold, it is determined that the received signal has not been affected by interference and the combination processing for each subcarrier is started (S13). In the combination processing of subcarrier units, the signal quality (for example SNR) of each subcarrier that has been estimated and held by the subcarrier estimation and holding device 28 is read out (S14). A weighting factor is then set for each subcarrier correspondingly to this signal quality and symbol weighting is performed in subcarrier units (S15). The weighting processing is performed for each subcarrier, while successively incrementing the subcarrier counter 29, till the weighting of all the subcarriers is completed (S17). The operations are repeated till the weighting of all the subcarriers is completed (S16), and a combined symbol that has been combined in subcarrier units is generated.

Figure 17:
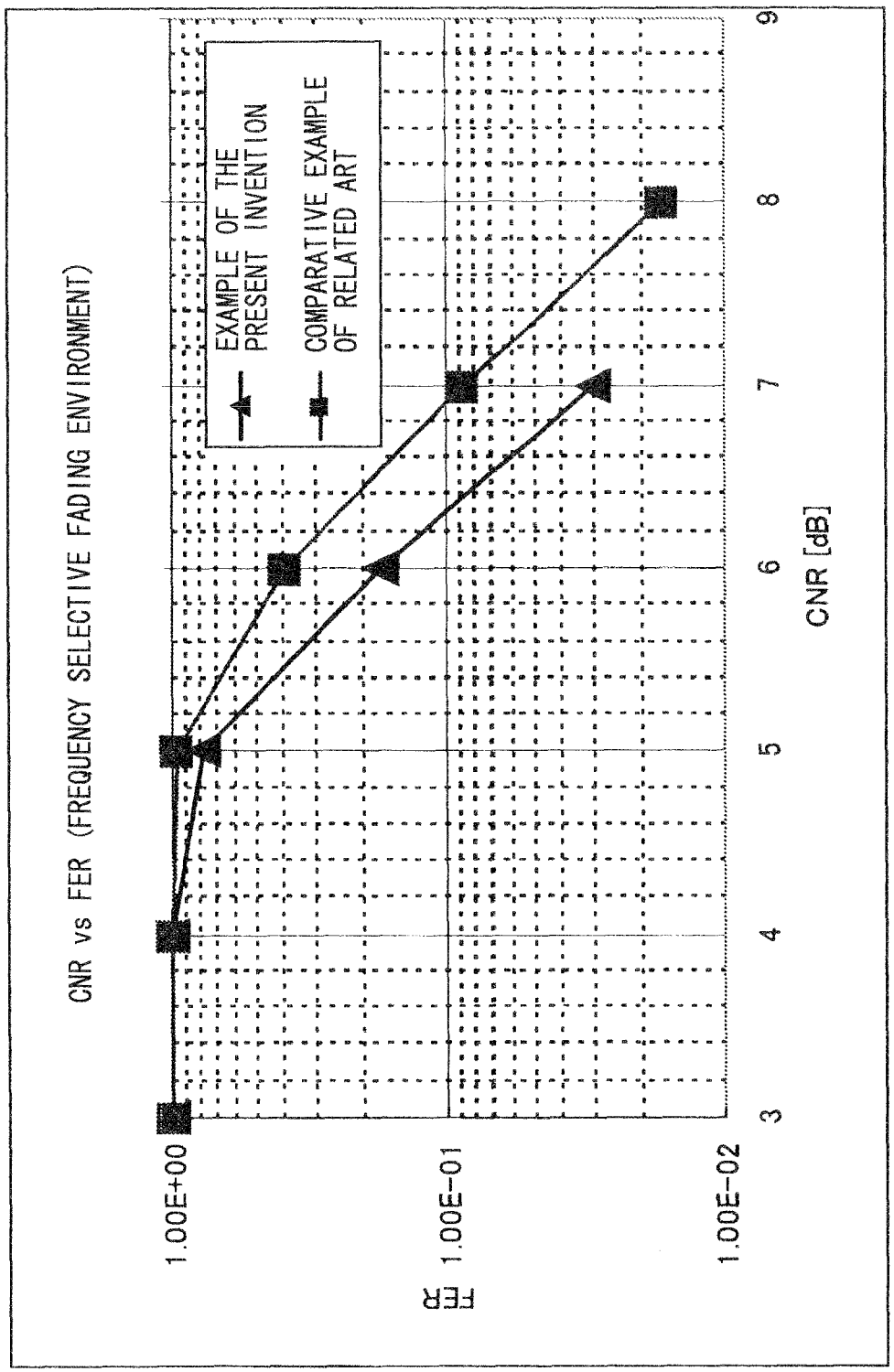
FIG. 17 is a diagram showing a relationship between a CNR (Carrier to Noise Ratio) and FER (Frame Error Rate) in the receiver of the present embodiment and the conventional receiver.
Figure 18:
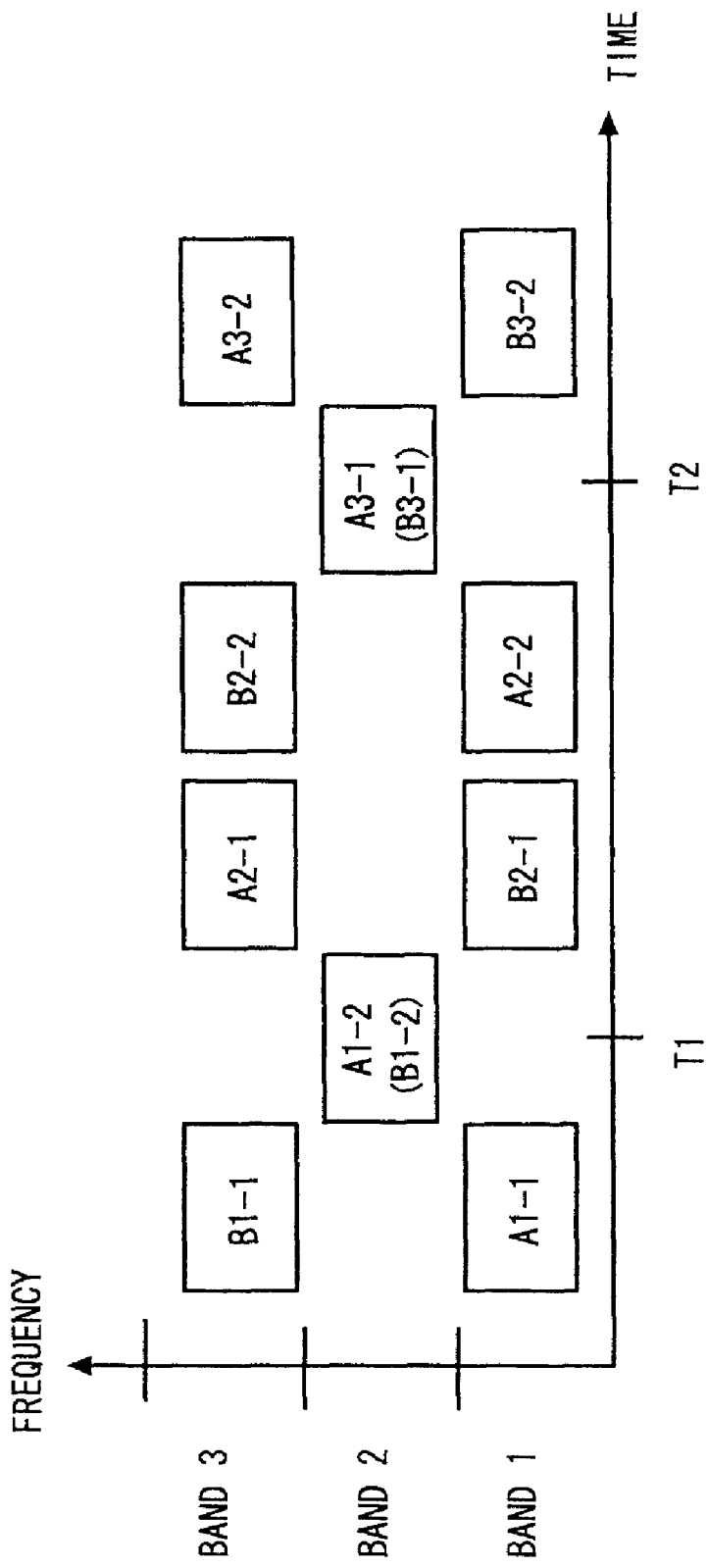
FIG. 18 is a diagram showing a way to transmit a data with hopping the carrier frequency in the MB-OFDM system.
Figure 19:
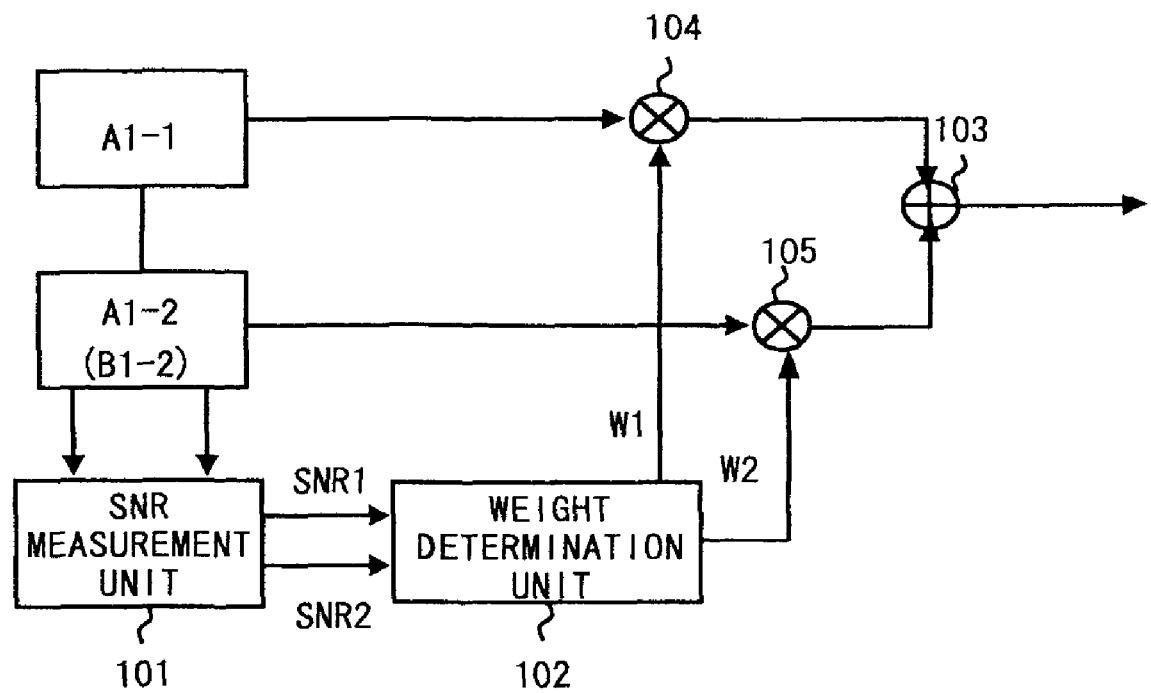
FIG. 19 is a block diagram illustrating a symbol combination circuit that combines symbols of the receiver described in Japanese Patent Application No. 2005-269392.

FIG. 17 illustrates the relationship between a CNR (Carrier to Noise Ratio) and FER (Frame Error Rate) in the receiver of the present embodiment and the conventional receiver. As shown in FIG. 17, the receiver of the present embodiment ensures a lower error rate than the conventional receiver under the same CNR conditions. Thus, it is clear that in the receiver of the present embodiment, the effect of noise under a frequency selective fading environment is reduced.

Thus, in the receiver of the present embodiment, by performing weighting for each subcarrier contained in the received symbol, a large weighting factor is set for the subcarrier with good signal quality and a small weighting factor is set for the subcarrier with poor signal carrier, even within the same symbol, whereby the reception characteristic under frequency selective fading environment can be improved.

Further, in the receiver of the present embodiment, it is determined whether there is interference of received signals, and switching is carried out such that when the received signal is affected by the interference, weighting is performed for each symbol, whereas when no interference is observed, weighting is performed for each subcarrier. As a result, the combined symbol can be generated by the optimum combination method at all times even under the frequency selective fading environment.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A receiver comprising:
a subcarrier unit combination section performing weighting for each subcarrier of a received symbol based on quality of each subcarrier;
a symbol unit combination section performing common weighting for each subcarrier of a received symbol based on quality of the symbol; and
a combination system switching unit switching between use of the symbol unit combination section and the subcarrier unit combination section,
wherein the combination system switching unit comprises a combination system determination unit controlling the switching between use of the symbol unit combination section and subcarrier unit combination section, based on the quality of the symbol.

2. The receiver according to claim 1, wherein the symbol unit combination section receives a first symbol and a second symbol and calculates quality of the first symbol and the second symbol; and
the combination system determination unit determines the control of the switching between use of the symbol unit combination section and subcarrier unit combination section, based on a difference in quality between the first symbol and the second symbol.

3. The receiver according to claim 2, wherein when the difference in quality between the first symbol and the second symbol is equal to or lower than a predetermined threshold, the combination system switching unit determines the use of the subcarrier unit combination section.

4. The receiver according to claim 3, wherein the quality of the symbol is an average of a signal-to-noise ratio for each of the subcarriers carrying the symbol.

5. The receiver according to claim 2, wherein the quality of each of the subcarriers is a signal-to-noise ratio.

* * * * *